(12) United States Patent
Moon et al.

(10) Patent No.: US 7,658,502 B2
(45) Date of Patent: Feb. 9, 2010

(54) BACK LIGHT STRUCTURE OF LIQUID CRYSTAL DISPLAY DEVICE

(75) Inventors: Jong-Won Moon, Gyeonggi-Do (KR); Sung-Jin Kim, Daegu (KR); Sang-Yun Lee, Gyeongsangbuk-Do (KR); Jeong-Hoon Ko, Ulsan (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 10/962,519

(22) Filed: Oct. 13, 2004

(65) Prior Publication Data
US 2005/0141212 A1 Jun. 30, 2005

(30) Foreign Application Priority Data
Dec. 29, 2003 (KR) ................ 10-2003-0099380

(51) Int. Cl.
*G02F 1/13357* (2006.01)
(52) U.S. Cl. .............. 362/97.2; 362/97.1; 362/241; 362/246
(58) Field of Classification Search .......... 362/29, 362/30, 606, 607, 611, 613, 614, 617, 618, 362/619, 623, 624, 625, 626, 629, 97.1, 97.2, 362/237, 241, 246
See application file for complete search history.

(56) References Cited

U.S. PATENT DOCUMENTS

| | | | | |
|---|---|---|---|---|
| 4,733,335 A | * | 3/1988 | Serizawa et al. ............ 362/800 |
| 5,575,549 A | * | 11/1996 | Ishikawa et al. ............ 362/625 |
| 5,764,310 A | * | 6/1998 | Yamagishi ................... 349/5 |
| 6,260,994 B1 | * | 7/2001 | Matsumoto et al. ......... 362/574 |
| 6,746,129 B2 | * | 6/2004 | Ohkawa ..................... 362/625 |
| 2001/0024260 A1 | | 9/2001 | Kitada |
| 2002/0167811 A1 | * | 11/2002 | Blanchard ................... 362/29 |
| 2003/0058635 A1 | * | 3/2003 | Matsui ....................... 362/29 |
| 2003/0081153 A1 | | 5/2003 | Kobayashi et al. |
| 2003/0184993 A1 | | 10/2003 | Yamada |
| 2005/0002204 A1 | * | 1/2005 | Lin et al. ..................... 362/30 |

FOREIGN PATENT DOCUMENTS

| | | |
|---|---|---|
| CN | 1316668 A | 10/2001 |
| JP | 54-151832 | 11/1979 |
| JP | 06-047929 | 6/1994 |
| JP | 08-146415 | 6/1996 |
| JP | 09-050030 | 2/1997 |
| JP | 09-211453 | 8/1997 |
| JP | 10-333144 | 12/1998 |
| JP | 11-337933 | 12/1999 |
| JP | 2000-047208 | 2/2000 |
| JP | 2000-182418 | 6/2000 |
| JP | 2001-202814 | 7/2001 |
| JP | 2002-122863 | 4/2002 |
| JP | 2003-131216 | 5/2003 |
| JP | 04-088264 | 3/2004 |

* cited by examiner

*Primary Examiner*—Y My Quach Lee
(74) *Attorney, Agent, or Firm*—McKenna Long & Aldridge (57) ABSTRACT

A back light structure includes lamps for supplying light to an LCD panel, and a micro-lens formed on over or below the lamps, the micro-lens having a plurality of concave portions or convex portions.

7 Claims, 9 Drawing Sheets

BACK LIGHT STRUCTURE OF LIQUID CRYSTAL DISPLAY DEVICE

The present invention claims the benefit of Korean Patent Application No. 2003-99380 filed in Korea on Dec. 29, 2003, which is hereby incorporated by reference.

BACKGROUND OF THE INVENTION

1. Field of the Invention

The present invention relates to a back light structure of a liquid crystal display device, and particularly, to a direct type back light structure of a liquid crystal display that provides an improved contrast ratio.

2. Description of the Related Art

Because of the recent developments in various portable electronic devices, such as mobile phones, PDAs and notebook computers, the demand for a light, thin, small flat panel display device is increasing. Research is actively ongoing on several types of flat panel display devices including LCD (Liquid Crystal Display), PDP (Plasma Display Panel), FED (Field Emission Display), VFD (Vacuum Fluore scent Display) and other technologies. Of the aforementioned flat panel display devices, the LCD has received much attention because it is simple to mass produce and can be easily used with a driving system that implements a high quality picture.

The LCD device is a transmissive display device. More particularly, an LCD device displays a desired image by controlling the amount of light transmitted through a liquid crystal layer by using the refractive anisotropy of the liquid crystal molecules in the liquid crystal layer. A back light is on the LCD device and used as a light source for light transmitted through a liquid crystal layer to display an image.

In general, there are two types of back lights. The first type of back light is the edge type back light in which a lamp is at an edge of an LCD panel for providing light to the liquid crystal layer. The second type of back light is the direct type back light in which a lamp is positioned directly under the LCD panel for providing light to the liquid crystal layer.

The edge type back light includes a low profile reflector and a light guide positioned directly under the LCD panel. The edge type back light is commonly used in a notebook computer or like devices which require a thin display device. However, the edge type back light has problems. For example, the edge type back light is not suitable for a large LCD panel because the lamp positioned at the edge of the LCD panel can not provide enough light across a large LCD panel. In another example, high brightness is difficult to obtain because the light is supplied through a light guide, which causes light loss. Thus, an edge type back light is only suitable for a small LCD panel. In other words, an edge type back light would not be desirable for a large LCD TV display.

The direct type back light can be used in a large LCD panel because the light generated from the lamp or lamps of a direct back light is supplied directly to the liquid crystal layer. Thus, light of high brightness can be obtained uniformly across the LCD panel. Thus, the direct type back light is typically being used to fabricate an LCD panel for an LCD TV display.

Figure 1:
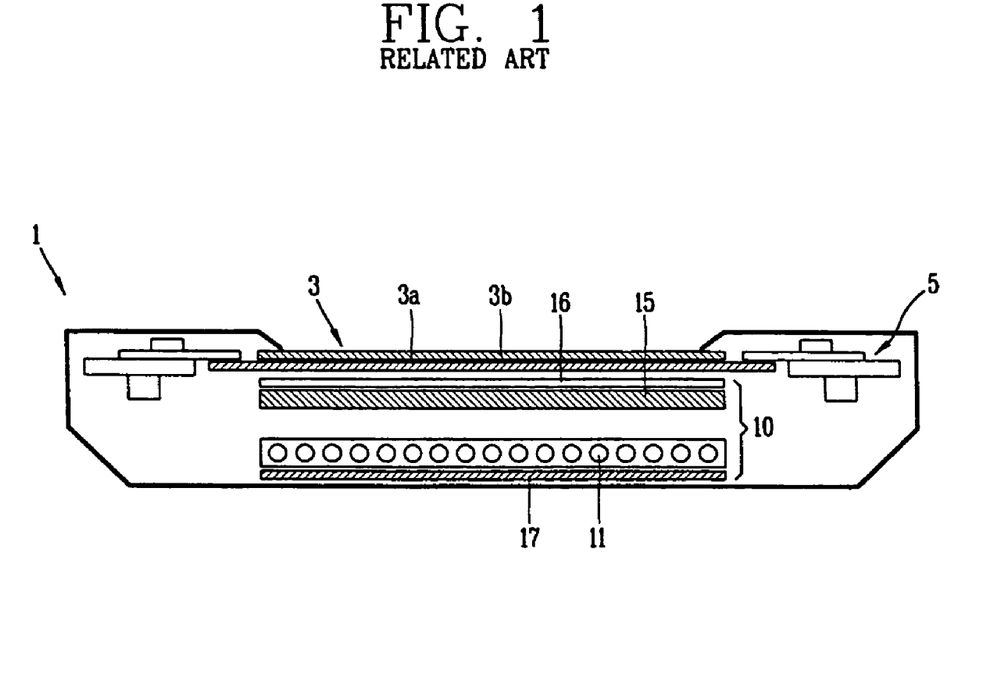
FIG. 1 is a view showing a structure of an LCD device provided with a back light according to the related art.

FIG. 1 shows a structure of an LCD device using the direct type back light in accordance with the related art. As shown in FIG. 1, the LCD device 1 includes an LCD panel 3; and a back light 10 at a back surface of the LCD panel 3. The LCD panel 3 is where an image is actually displayed. The LCD panel includes a transparent lower substrate 3a and an upper substrate 3b, such as glass, and a liquid crystal layer (not shown) formed between the lower and upper substrates 3a and 3b. Although not shown in FIG. 1, the lower substrate 3a is a TFT substrate having driving structures, such as thin film transistors and pixel electrodes, and the upper substrate 3b is a color filter substrate having a color filter layer. In addition, a driving circuit unit 5 is provided at a side of the lower substrate 3a to apply a signal to the pixel electrodes via the thin film transistors.

The back light 10 includes a lamp 11 for emitting light; a reflector 17 for reflecting light emitted from the lamp 11 to improve optical efficiency; and an optical elements for making the light, which is emitted from the lamp 11, to be uniformly incident upon an LCD panel 3. The optical elements of the direct type back light 10 are commonly a diffuser sheet 15 and a diffuser plate 16. The diffuser sheet 15 and diffuser plate 16 scatter light generated from the lamp 11 so that light is uniformly distributed across the LCD panel 3. However, there is a limit to the amount of light that can be uniformly distributed across the LCD panel. In addition, because the diffuser sheet 16 diffuses the incident light omnidirectionally, a lot of light diffuses out the sides, which causes degradation in optical efficiency. If the diffuser sheet 16 is disposed on the diffuser plate 15, side scattering of light is prevented. However, in such a case, back scattering of the diffuser plate 15 and the diffuser sheet 16 occurs, thereby degrading the optical efficiency, and an internal temperature of the back light 10 increases. Moreover, to improve straightness of light emitted from the back light 10, a prism sheet may be employed. However, such a prism sheet causes an increase in cost, and, substantially, there is limit to how much the straightness of light can be improved with the prism sheet.

SUMMARY OF THE INVENTION

Accordingly, the present invention is directed to a back light structure of a liquid crystal display device that substantially obviates one or more of the problems due to limitations and disadvantages of the related art.

An object of the present invention is to provide a back light structure of an LCD panel to uniformly supply light to an LCD panel.

Another object of the present invention is to provide a back light structure of an LCD panel that has an improved contrast ratio by converging light toward a center of the LCD panel using micro-lens.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, the back light structure includes lamps for supplying light to an LCD panel, and a micro-lens formed on over the lamps, the micro-lens having a plurality of concave portions or convex portions.

In another aspect, the back light structure includes lamps for supplying light to an LCD panel, a reflector for reflecting the light from the lamps, and a micro-lens on the reflector.

In another aspect, the back light structure includes lamps for supplying light to an LCD panel, and a reflector under the lamps to reflect light from the lamps, the reflector including a micro-lens.

In another aspect, the back light structure includes lamps for supplying light to an LCD panel, and a reflector having concave portions in which the lamps are respectively disposed.

In another aspect, the back light structure includes lamps for supplying light to an LCD panel, a reflector for reflecting light from the lamps, and a first micro-lens over the lamps.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

A plurality of lamps are disposed at the back light, separated at regular intervals. As a result, a brightness difference occurs between a region of an LCD panel where the lamps are positioned and the other regions. Thus, a direct type back light using a plurality of lights generally requires light diffusion.

Light is emitted from the lamps within a certain angular range. The brightness difference may decrease reason if the lamp and the LCD panel are separated from each other at a certain distance large enough such that the angular range covers more of the LCD panel. However, an increase in distance between the lamp and the LCD panel causes an increase in the profile of an LCD device.

Although a related art diffuser plate made of acrylic resin or the like that has good diffusion characteristics, such as PMMA (Poly-Methyl-Metacryl Acrylate), scatters input light so that light is made incident upon an entire LCD panel uniformly. However, there is a limit to the performance of the PMMA. Besides, the PMMA is easily damaged by heat and bends due to gravity because it is made of a soft material. Such heat damage or bending makes uniform light diffusion impossible.

In exemplary embodiments of the present invention, light diffusion is done using a morphological characteristic. The morphological characteristics has good diffusion characteristics. Further, the use of a morphological characteristic effectively prevents the effect of heat and bending due to gravity.

The improvement of the diffusion characteristics of the diffusion means not only that an image quality of an LCD device can be improved because of uniform brightness over the entire LCD panel but also that an interval between a lamp and the diffusion means may be small. Namely, this means that the size of a back light may be decreased. Accordingly, by providing a diffusion means having good diffusion characteristics, the entire size of the LCD device may be decreased.

Figure 2A:
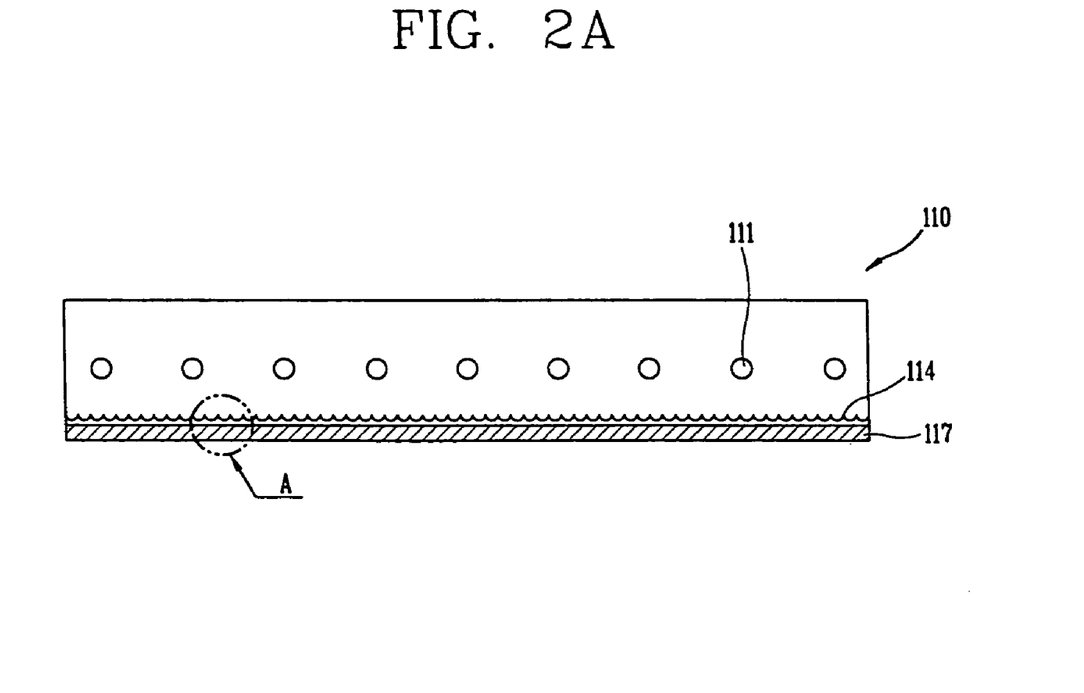
FIG. 2A is a sectional view showing a structure of a back light structure according to a first embodiment of the present invention.
Figure 2B:
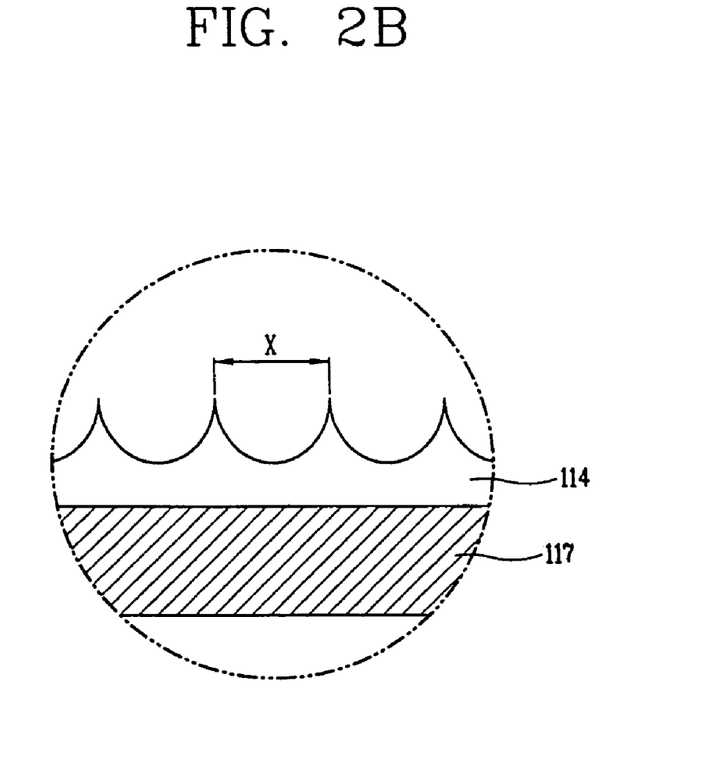
FIG. 2B is an enlarged view of area A in FIG. 2A.

A back light structure of an LCD device according to exemplary embodiments of the present invention will now be described in detail with reference to accompanying drawings. FIG. 2A is a sectional view showing a structure of a back light structure according to a first embodiment of the present invention. The back light 110 depicted in FIG. 2A is positioned under an LCD panel to supply light to the LCD panel, similarly to the back light depicted in FIG. 1. FIG. 2B is an enlarged view of area A in FIG. 2A.

As shown in FIG. 2A, a direct type back light 110 is provided with a plurality of lamps 111 to supply light to an LCD panel (not shown) positioned over the back light 110. A cold cathode fluorescent lamp (CCFL) is typically used as one of the lamps 111. An inverter is connected to both ends of each of the lamps so that a current is applied to each of the lamps. A reflector 117 is under the lamps 111 to reflect light emitted from the lamps 111 toward the LCD panel.

A micro-lens 114 is coupled on the reflector 117. Light is diffused (or scattered) by the micro-lens 114 first and then reflected by the reflector 117. Then, the reflected light is diffused again by the micro-lens 114 a second time and then is incident upon the LCD panel. Thus, the light reflected by the reflector 117 is completely diffused when incident on the LCD panel. Because the micro-lens 114 having lots of micro-concave lenses is disposed on the reflector 117, light reflected by the reflector 117 is completely scattered (or diffused) by the micro-lens 114.

As shown in FIG. 2B, the micro-lens 114 may have a pitch (x) of a few micrometers to a few centimeters. In particular, the pitch (x) may be chosen to ultimately direct light to vertically incident upon the LCD panel. Alternatively or in addition, the pitch (x) may be chosen to ultimately converge light toward a center of the LCD panel, such that light intensity is the highest at the center of the LCD panel, thereby increasing the contrast ratio of the LCD panel.

As described above, the micro-lens 114 is on the reflector 117 so that the back light emits light that is completely diffused. The completely diffused light can be supplied to an LCD panel. Moreover, because light reflected by the reflector 117 is diffused two times, diffusion efficiency is improved. Because the light can be more effectively diffused, as compared to the related art LCD device using a diffuser plate made of PMMA, the image quality of an LCD device is improved.

The micro-lens 114 can have a circular shape or a cylindrical shape. Further, a micro-lens 114 having a different pitch (or curvature of lens) can be made according to needs. Thus, a half-power angle of brightness may be easily controlled.

Figure 3A:
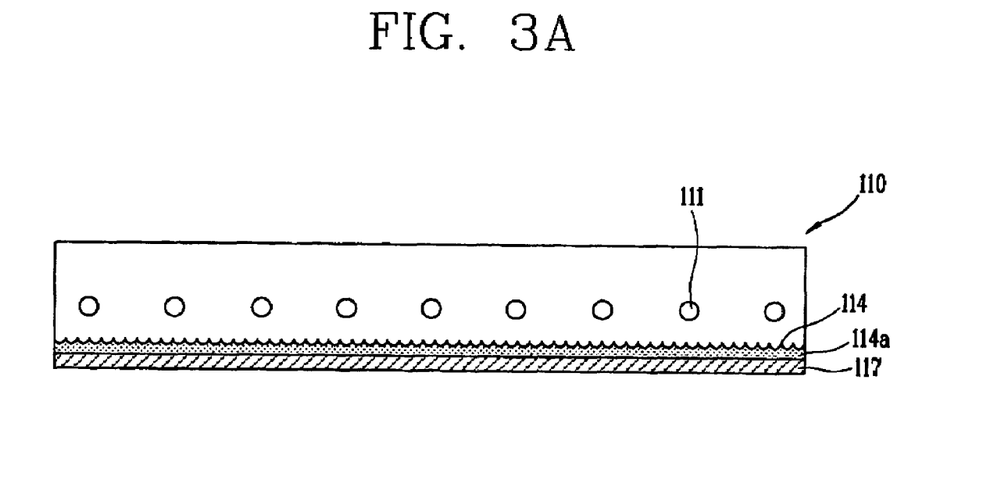
FIGS. 3A to 3C are views showing different examples of a back light according to the first embodiment of the present invention.
Figure 3B:
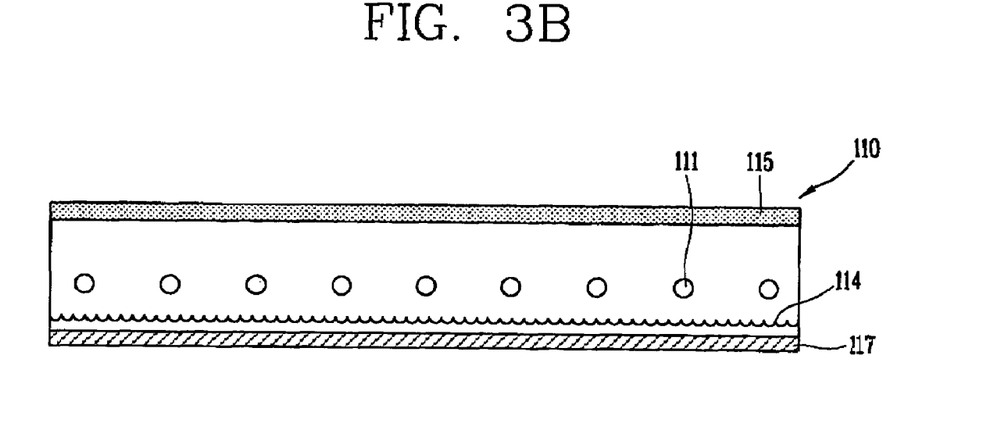
Figure 3C:
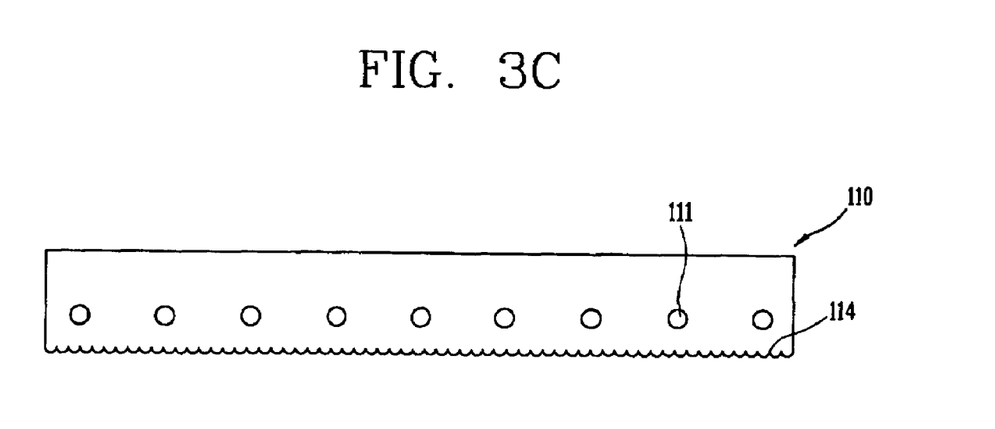

FIGS. 3A to 3C are views showing different examples of a back light according to the first embodiment of the present invention. In the back light 10a depicted in FIG. 3A, the micro-lens 114 on the reflection plate 117 is formed of a diffusion material. The diffusion material 114a of the micro-lens 114 can be acrylic resin, such as PMMA, having good diffusion characteristics. As discussed above, light is diffused twice by the micro-lens 114 such that diffusion is improved.

In a back light 110 depicted in FIG. 3B, a diffuser plate 115 is at an upper portion of the back light 110. The diffuser plate 115 is made of PMMA, and light twice diffused through the micro-lens 114 is diffused again by the diffuser plate 115. Thus, the diffusion efficiency is further improved.

In a back light 110 depicted in FIG. 3C, the reflector 117a has a micro-lens shape. Accordingly, light incident upon the reflector 117a from the back light 110 is not only reflected but also diffused simultaneously. The diffusion efficiency is improved while fabrication costs are reduced because there is no need to provide a separate micro-lens layer.

The examples depicted in FIGS. 3A to 3C are different examples of the first embodiment. In another example, a back light may have a structure in which the micro-lens 114a, which is formed of a diffusion material, and the diffuser plate 114 is provided at an upper portion of the back light. Also, the diffuser plate 115 may be at an upper portion of a back light having the lens-shaped reflector 117a.

Figure 4A:
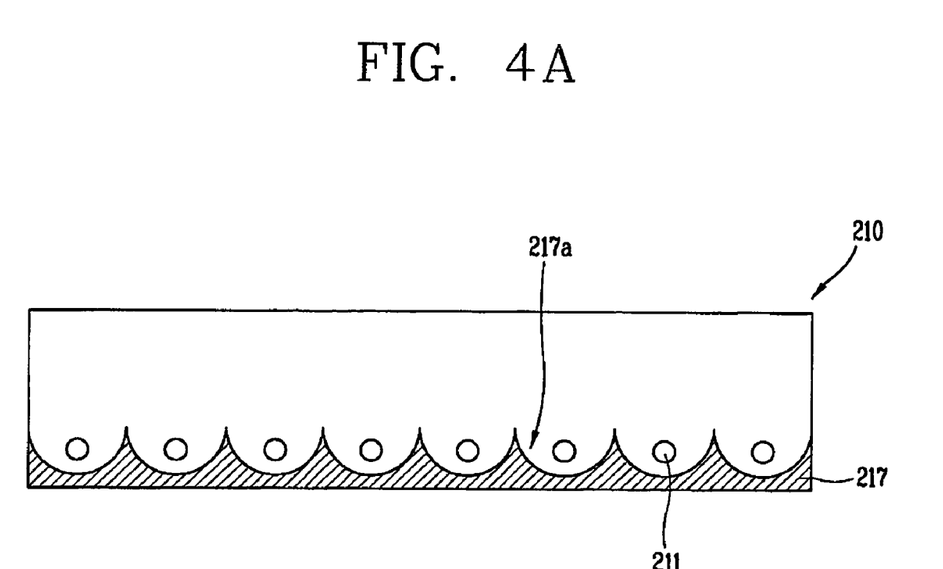
FIGS. 4A and 4B are sectional views showing a structure of a back light according to a second embodiment of the present invention.
Figure 4B:
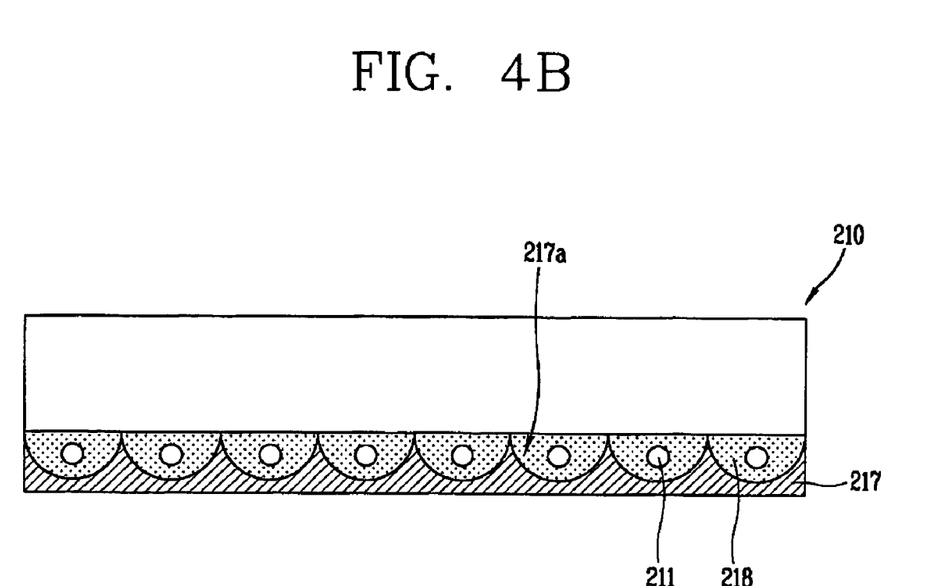
Figure 5A:
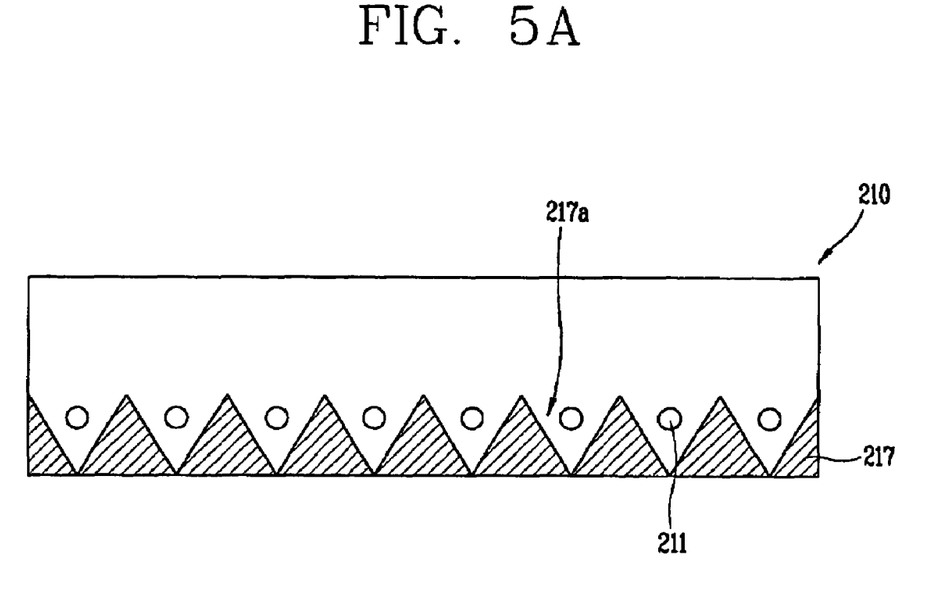
FIGS. 5A and 5B are views showing different shapes in a back light according to the second embodiment of the present invention.
Figure 5B:
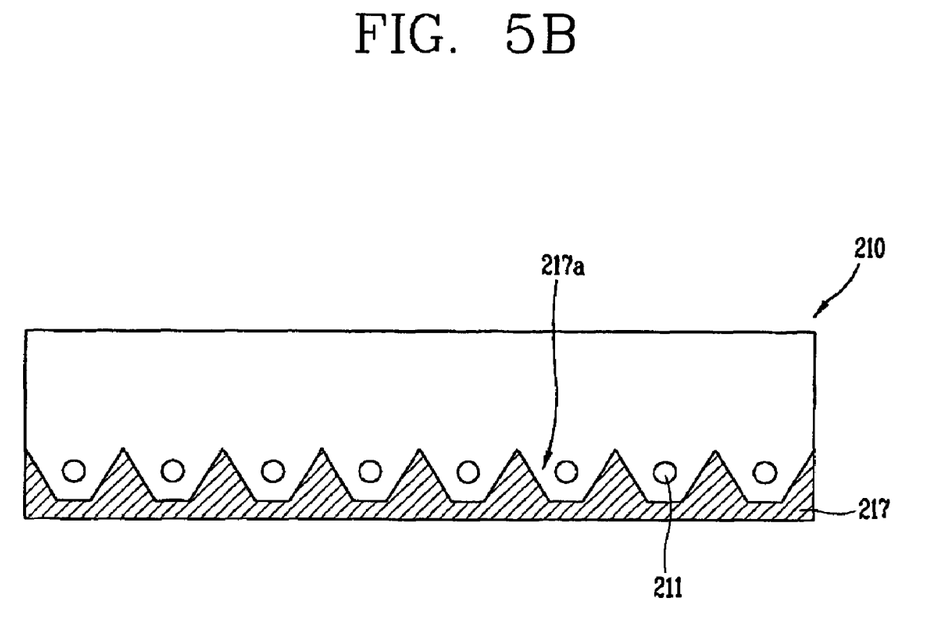

FIGS. 4A and 4B are sectional views showing a structure of a back light 210 according to a second embodiment of the present invention. FIGS. 5A and 5B are views showing different shapes in a back light according to the second embodiment of the present invention. As shown in FIG. 4A, a reflector 217 has a plurality of concave portions 217a having a semicircular shape and a lamp 211 is disposed in each concave portion 217a. Light emitted from the lamp 211 is incident upon a surface of each of the semicircular (or well-shaped) concave portions 217a, that is, a surface of the reflector 217 and is reflected (diffused) in various directions so that the reflected light is uniformly supplied to an LCD panel. The concave portions 217a formed in the reflector 217 can be formed in any shape so long as the light is reflected in various directions. For example, the concave portions 217a can be formed in triangular shapes, as shown in FIG. 5A or in trapezoidal shapes, as shown in FIG. 5b. In addition or in the alternative, the concave portions 217a can be other shapes.

As shown in FIG. 4B, the concave portions 217a of the reflector 217 can be formed of a transparent material 219. Because the transparent material 219 has a different refractive index from air, which is generally greater than the reflective index of air, when the light reflected by the surfaces of the concave portions 217a (i.e., light reflected by reflector) reaches a boundary between the transparent material 219 and air, the light is refracted in accordance with Snell's law, and thus the diffusion characteristics are further improved.

The concave portions 217a can be fabricated with shapes or curvatures (in the case of circular concave portions) and the transparent material 219 having a specific refractive index can be controlled. Accordingly, the extent of light diffusion by the concave portions 217a and a half-power angle can be controlled. Such the transparent material 219 can be used to fill concave portions depicted in FIGS. 5A and 5B, that is, triangular concave portions or trapezoidal concave portions.

Figure 4C:
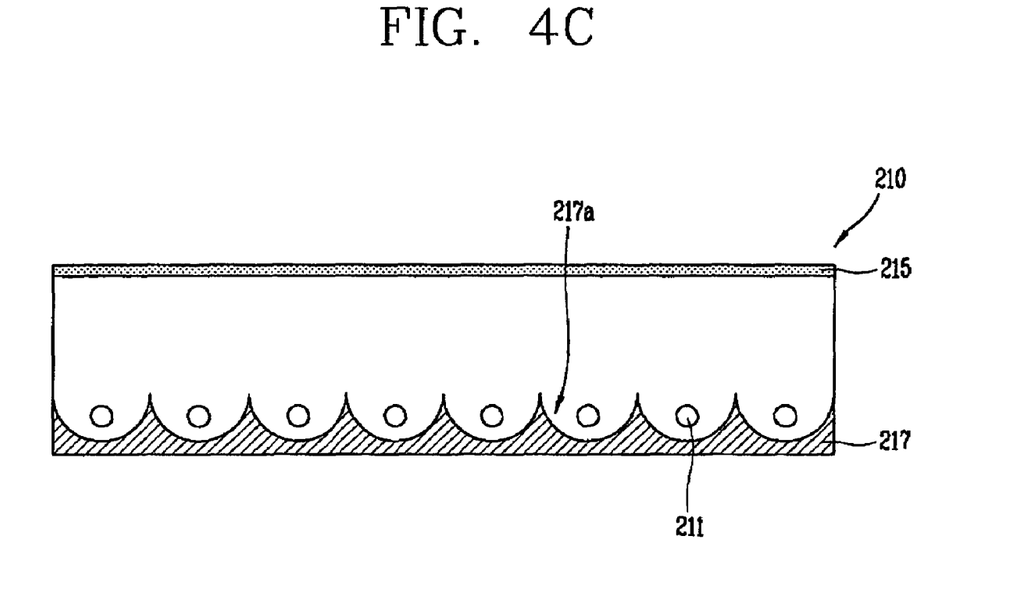
FIG. 4C illustrates a sectional view of a back light in accordance with a further embodiment of the present invention.
Figure 4D:
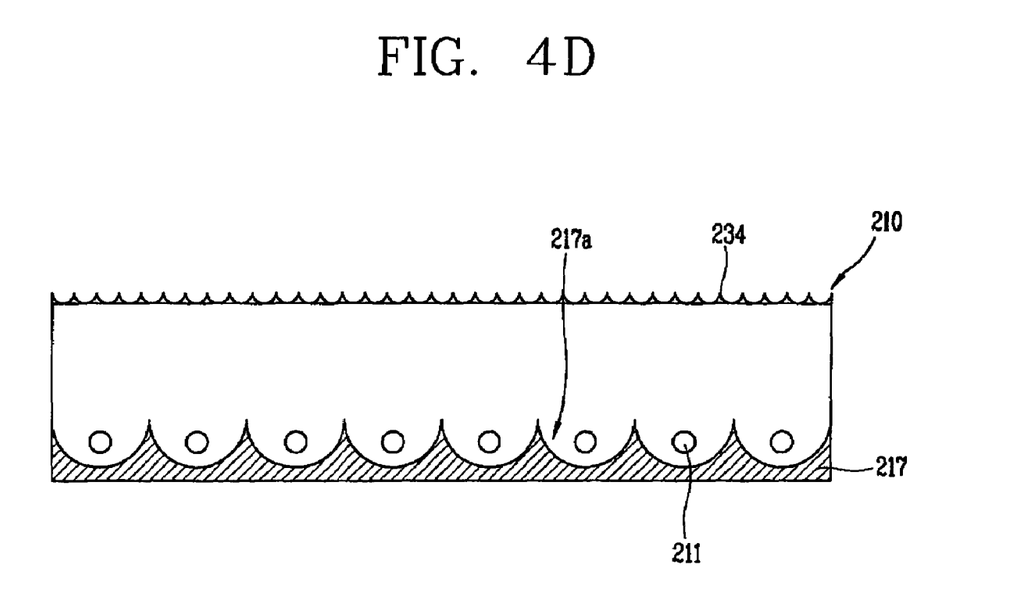
FIG. 4D illustrates a sectional view of a back light in accordance with an embodiment of the present invention.

FIG. 4C illustrates an embodiment of the present invention where a diffuser plate 215 is disposed over the lamps 211, in accordance with an embodiment of the present invention. FIG. 4D illustrates a micro lens 234 disposed over the lamps 211 and the reflector 217, in accordance with an embodiment of the present invention.

Figure 6A:
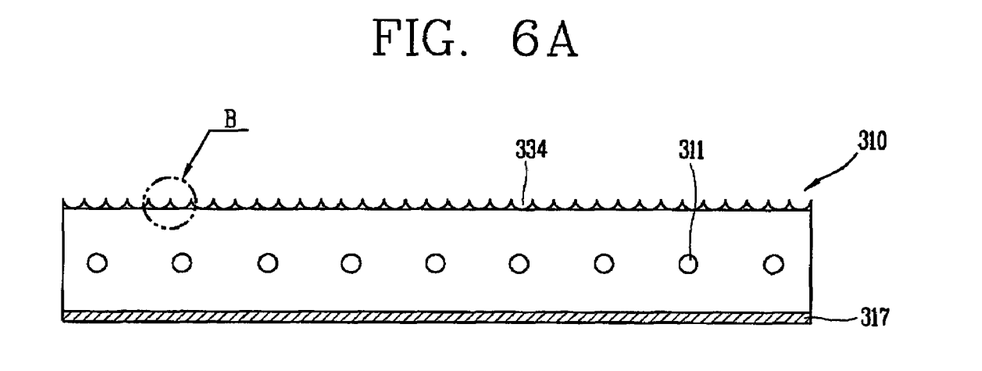
FIG. 6A is a sectional view showing a structure of a back light according to a third embodiment of the present invention.
Figure 6B:
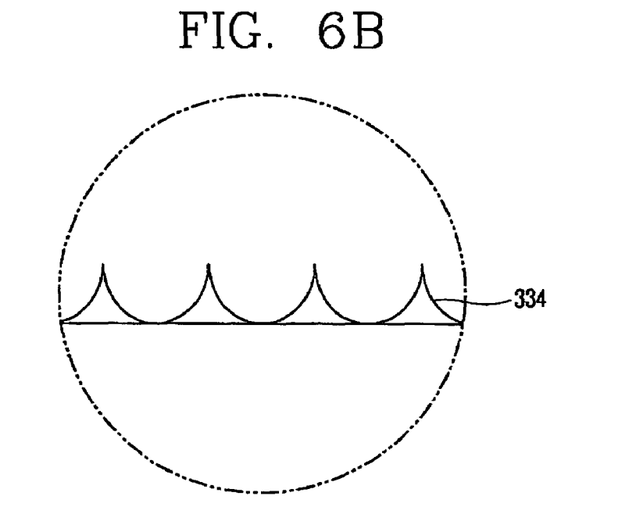
FIG. 6B is an enlarged view of area B in FIG. 6A.

FIG. 6A is a sectional view showing a structure of a back light according to a third embodiment of the present invention. FIG. 6B is an enlarged view of area B in FIG. 6A. As shown in FIGS. 6A and 6B, a back light 310 includes a micro-lens 334 mounted in an upper portion of the back light 310. The micro-lens 334 can have a pitch as fine as a few micrometers to a few centimeters. The micro-lens 334 completely scatters (diffuses) light incident from the lamp 311 so as to supply diffused light to an LCD panel. Accordingly the light can uniformly distributed across the LCD panel.

The micro-lens 334 can be formed in various shapes and sizes. By controlling the shape and the size of the micro-lens 334, the extent of diffusion and straightness of light can be controlled. Thus, the half-power angle for each lamp is easily controlled.

Figure 6C:
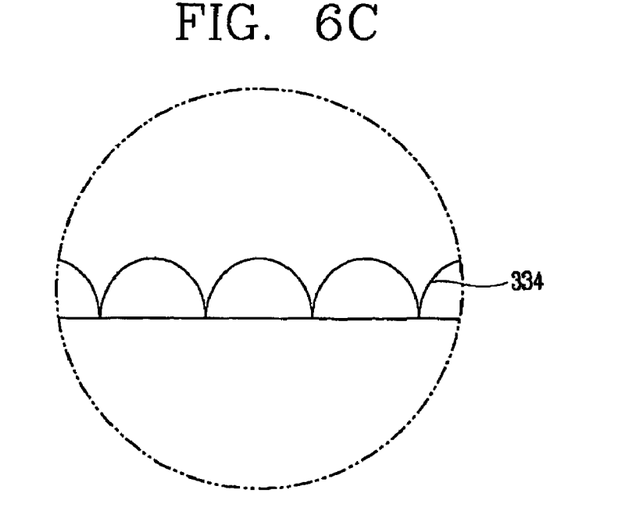
FIG. 6C is an enlarged view of a different structure of a micro-lens according to the third embodiment of the present invention.

Although the micro-lens 334 is shown as a concave lens that faces upward (or convex lens when viewed from the back light) in FIGS. 6A and 6B, the micro-lens can be formed as a convex lenses 334 that faces upward (or, concave lens when viewed from the back light) as shown in FIG. 6C. In addition, the micro-lens may have any shape, such as a spherical shape or an aspherical shape, so long as incident light can be diffused.

Figure 6D:
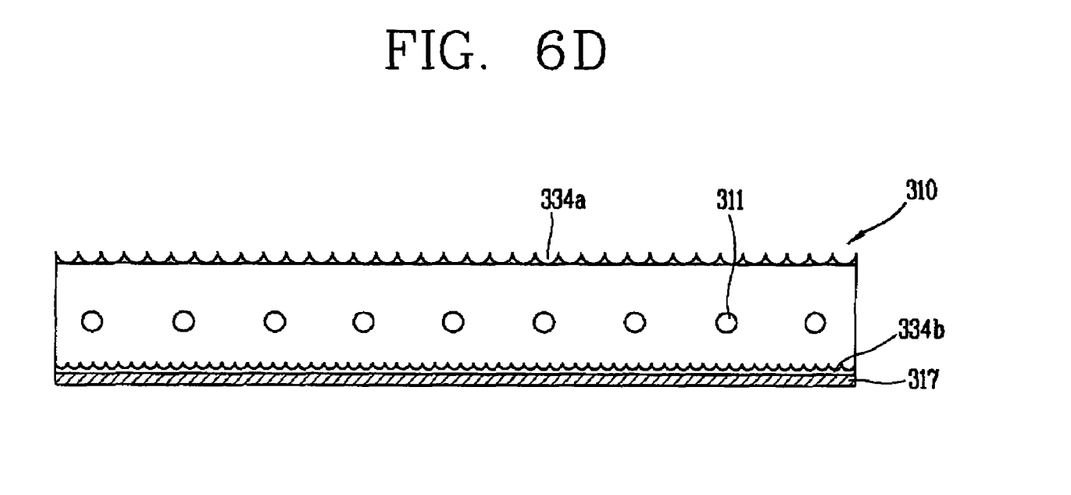
FIG. 6D is a sectional view of back light in accordance with another embodiment of the present invention.

FIG. 6D is a sectional view of back light in accordance with another embodiment of the present invention. As shown in the Figure, the back light 310 includes the micro lens 334 and second micro lens 334b on the reflector 317.

Figure 6E:
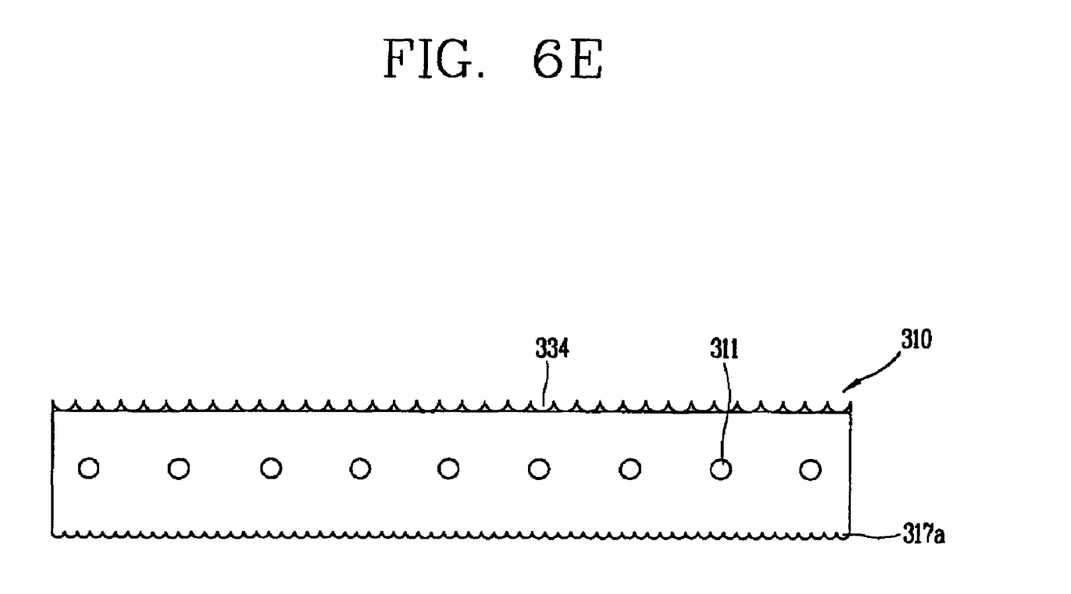
FIG. 6E is sectional view of a back light in accordance with a further embodiment of the present invention.

FIG. 6E is sectional view of a back light in accordance with a further embodiment of the present invention. Here, a reflector 317a is formed as a micro lens.

Figure 7A:
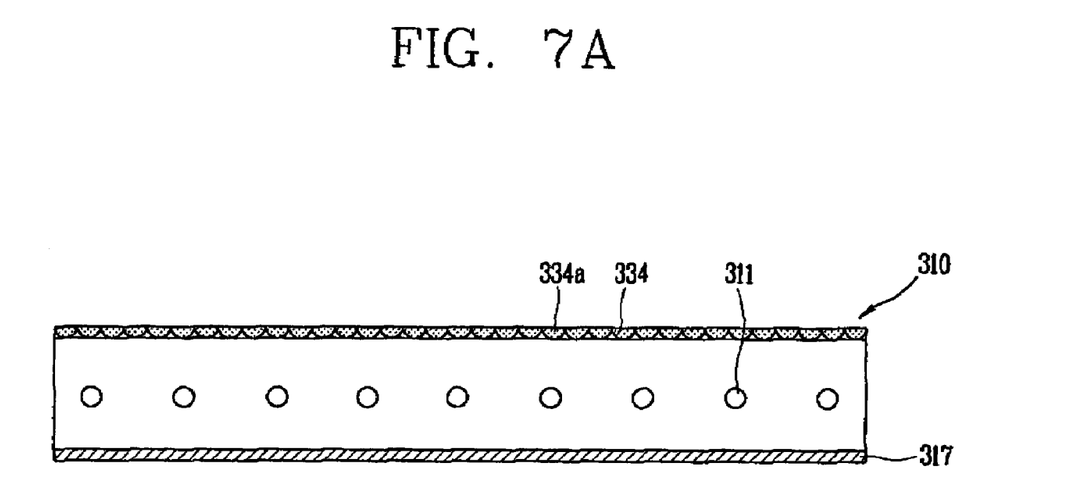
FIGS. 7A and 7B are views showing different embodiments of a back light according to the third embodiment of the present invention.
Figure 7B:
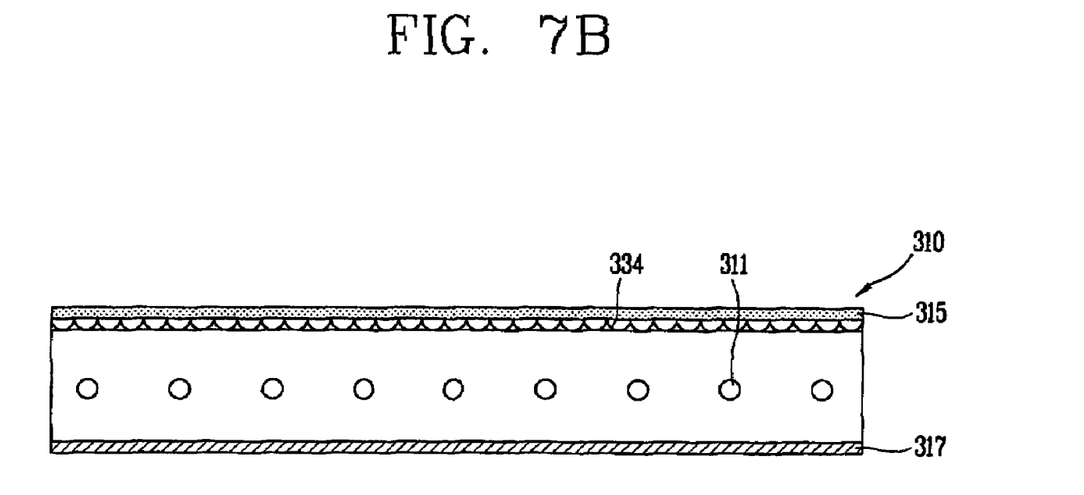

FIGS. 7A and 7B are views showing different structures of the back light according to the third embodiment of the present invention. In the back light 310a depicted in FIG. 7A, the micro-lens 334 at an upper portion of the back light 310a is formed of a diffusion material 334a, such as PMMA. Furthermore, as may be clearly seen in FIG. 7A, the diffusion material 334a is formed in concave portions of the micro-lens 334. Accordingly, light diffused by the micro-lens 334 is diffused again by the diffusion material 334a, thereby improving diffusion efficiency. Accordingly, the light can be supplied to the LCD panel uniformly. In the back light 310b depicted in FIG. 7B, a diffuser plate 315 is on the micro-lens 334. Accordingly, light generated from the lamp 311 is diffused twice by the micro-lens 334 and the diffuser plate 315, thereby further improving diffusion characteristics.

As so far described, diffusion characteristics are improved by installing the micro-lens at a lower portion of the back light, an upper portion of the back light or forming a concave portions on the reflector. Although the first to third embodiments are described as if they are separate and distinct structures, embodiments of back light structures in the present invention are not limited to these three embodiments. Embodiments of the present invention can include any combination of features found in the thirst to third embodiments. For example, embodiments of the present invention can include a back light having a structure with a micro-lens (or micro-lens formed of a diffusion material) on a lower portion of the back light, or that a concave portion (or concave portion formed of transparent material having a different refractive index from air) is formed in the reflector while another micro-lens (or micro-lens formed of a diffusion material) is at an upper portion of the back light.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A back light structure of a liquid crystal display device comprising:
    lamps for supplying light to the liquid crystal panel above the lamps;
    a reflector under the lamps to reflect light from the lamps;
    a first micro-lens over the lamps, the first micro-lens having a plurality of concave portions or convex portions, wherein a diffusion material is formed in the concave portions and the convex portions so that the diffusion material is disposed at the outer surface of the first micro-lens, thereby the light from the first micro-lens is propagating in the diffusion material, wherein the first micro-lens is concaved toward to the lamps; and
    a second micro-lens on the reflector,
    wherein a plurality of concave portions are formed in the reflector and the lamps are respectively disposed in the concave portions and the concave portions are contained with a transparent material having a different refractive index than air so that the lamps are surrounded by the transparent material, the surface of the transparent material being flat.

2. The structure of claim 1, wherein the first micro-lens has a pitch of a few micrometers to a few centimeters.

3. The structure of claim 1, wherein the first micro-lens is convexed toward the lamps.

4. The structure of claim 1, wherein the first micro-lens is formed of a diffusion material.

5. The structure of claim 4, wherein the diffusion material includes acrylic resin.

6. The structure of claim 1, further comprising a diffuser plate over the first micro-lens.

7. The structure of claim 1, wherein the reflector is formed as a micro-lens.

* * * * *